(12) United States Patent
Aslanov et al.

(10) Patent No.: US 12,147,020 B2
(45) Date of Patent: Nov. 19, 2024

(54) LASER DEVICE INCLUDING LENS ASSEMBLY

(71) Applicant: Samsung Display Co., Ltd., Yongin-Si (KR)

(72) Inventors: Emil Aslanov, Asan-si (KR); Jongki Kim, Seoul (KR); Yoongyeong Bae, Goyang-si (KR); Gyoowan Han, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 370 days.

(21) Appl. No.: 17/239,732

(22) Filed: Apr. 26, 2021

(65) Prior Publication Data

US 2021/0364769 A1 Nov. 25, 2021

(30) Foreign Application Priority Data

May 21, 2020 (KR) .......................... 10-2020-0060999

(51) Int. Cl.
*G02B 19/00* (2006.01)
*B23K 26/06* (2014.01)

(52) U.S. Cl.
CPC ...... *G02B 19/0014* (2013.01); *B23K 26/0643* (2013.01); *B23K 26/0648* (2013.01); *B23K 26/0665* (2013.01); *G02B 19/0047* (2013.01)

(58) Field of Classification Search
CPC ............ B23K 26/0643; B23K 26/0648; B23K 26/0665; G02B 13/0045; G02B 13/0015; G02B 13/004; G02B 9/34; G02B 9/60; G02B 3/00; G02B 1/00

See application file for complete search history.

(56) References Cited

U.S. PATENT DOCUMENTS

| | | | |
|---|---|---|---|
| 5,087,987 A | | 2/1992 | Simbal |
| 6,037,967 A | * | 3/2000 | Allen ...................... G02B 26/12 |
| | | | 347/261 |
| 6,324,015 B1 | | 11/2001 | Fuse |
| 7,817,342 B2 | | 10/2010 | Shih et al. |
| 8,455,790 B2 | | 6/2013 | Tanaka et al. |
| 8,988,777 B2 | * | 3/2015 | Kajikawa ........... B23K 26/0617 |
| | | | 359/489.07 |
| 2004/0007563 A1 | * | 1/2004 | Hastings ............ B23K 26/0665 |
| | | | 219/121.69 |
| 2006/0289410 A1 | * | 12/2006 | Morita ............... B23K 26/0617 |
| | | | 219/121.75 |

(Continued)

FOREIGN PATENT DOCUMENTS

| CN | 105527706 A | * | 4/2016 |
|---|---|---|---|
| CN | 105527706 B | | 3/2018 |

(Continued)

*Primary Examiner* — Brian W Jennison
*Assistant Examiner* — Kristina J Babinski
(74) *Attorney, Agent, or Firm* — Innovation Counsel LLP (57) ABSTRACT

Provided is a laser device including a light source generating a laser beam, a stage, and a lens assembly disposed between the light source and the stage and irradiating the laser beam to a substrate disposed on the stage. The laser device is capable of irradiating a uniform laser beam over an entire processing area to which the laser beam is irradiated. Thus, the laser device may irradiate a uniform laser beam to not only a center area, but also the edge area of the processing area.

18 Claims, 8 Drawing Sheets

(56) References Cited

U.S. PATENT DOCUMENTS

2008/0151951 A1  6/2008  Elliott et al.
2015/0144812 A1* 5/2015  Ishikawa ............ G02B 13/0005
                                                   359/206.1
2017/0312856 A1* 11/2017 Chivel ...................... C23C 4/00

FOREIGN PATENT DOCUMENTS

JP         5137388 B2    2/2013
KR       10-1690874 B1  12/2016
KR       20180000119 U  *  1/2018

* cited by examiner

LASER DEVICE INCLUDING LENS ASSEMBLY

CROSS-REFERENCE TO RELATED APPLICATION

This U.S. non-provisional patent application claims priority under 35 U.S.C. § 119 of Korean Patent Application No. 10-2020-0060999, filed on May 21, 2020, the contents of which are hereby incorporated by reference in its entirety.

BACKGROUND

1. Field of Disclosure

The present disclosure relates to a laser device. More particularly, the present disclosure relates to a laser device which is used to manufacture a display device.

2. Description of the Related Art

Recently, the demand for a display device has increased due to the increasing demand in portable electronic devices. Furthermore, as the portable device becomes complicated, a sophisticated manufacturing process is required.

Among many other manufacturing processes, a laser assisted manufacturing process can be a good candidate to fabricate a display device. That is, a laser device can be used in a manufacturing process of a display device. In particular, the laser device is used to drill, cut, clean, mark, scan, crystallize, and surface-modify a workpiece. To this end, there is a need to develop a novel laser device that easily adjusts a shape, a size, and an energy density of a laser beam generated by the laser device.

SUMMARY

The present disclosure provides a laser device capable of irradiating a uniform laser beam over an entire processing area to which the laser beam is irradiated.

Embodiments of the present disclosure provide a laser device including a light source generating a laser beam, a stage, and a lens assembly disposed between the light source and the stage and irradiating the laser beam to a substrate disposed on the stage. The lens assembly includes a first lens assembly diffusing the laser beam provided from the light source, a deflector changing a path of the laser beam provided from the first lens assembly, and a second lens assembly condensing the laser beam provided from the deflector and irradiating the condensed laser beam to the substrate.

Embodiments of the present disclosure provide a lens assembly including a first lens assembly diffusing a laser beam, a deflector changing a path of the laser beam provided from the first lens assembly, and a second lens assembly condensing the laser beam provided from the deflector and irradiating the condensed laser beam to a substrate.

According to the above, the laser device includes the first lens assembly that diffuses the laser beam provided from the light source, and the focal lengths of lenses of the first and second lens assemblies to a total focal length of the lens assembly satisfies a predetermined ratio. Thus, the laser device may irradiate a uniform laser beam to not only a center area but also the edge area of the processing area.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be explained in detail with reference to the accompanying drawings.

Figure 1:
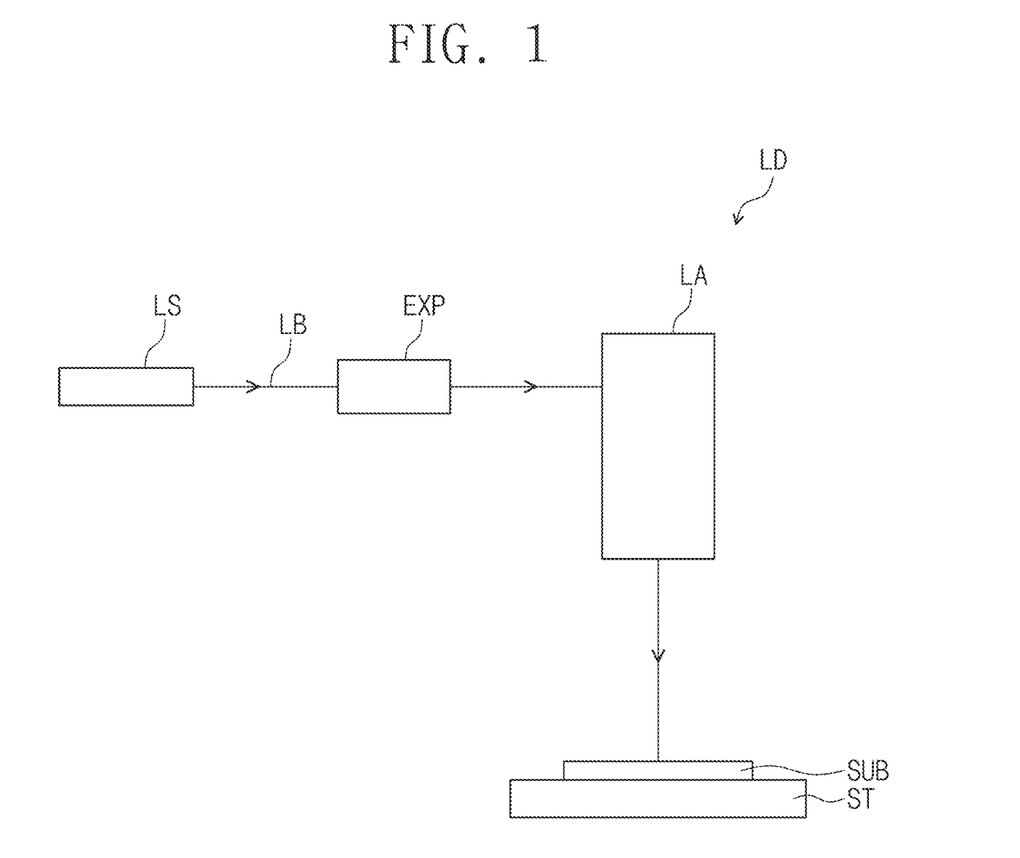
FIG. 1 is a schematic view showing a laser device according to an embodiment of the present disclosure.

FIG. 1 is a schematic view schematically showing a laser device LD according to an embodiment of the present disclosure.

Referring to FIG. 1, the laser device LD may include a light source LS, an expansion part EXP, a lens assembly LA, and a stage ST. A substrate SUB may be mounted on the stage ST.

In particular, the laser device LD according to the embodiment may be used to manufacture a display device. For example, the laser device LD may irradiate the laser beam LB to the substrate SUB to perform a drilling process, a cutting process, a scanning process, a cleaning process, and a marking process on the substrate SUB.

The light source LS may generate the laser beam LB. The light source LS may irradiate the generated laser beam LB to the expansion part EXP. As shown in FIG. 1, the laser beam LB may be irradiated in a horizontal direction. The expansion part EXP may be disposed to be spaced apart from the light source LS. For example, the expansion part EXP may be disposed to be spaced apart from the light source LS in the horizontal direction as shown in FIG. 1. The expansion part EXP may control a diameter and an energy density of the laser beam LB. In this case, the diameter of the laser beam LB may indicate the diameter of the laser beam LB when viewed in a direction in which the laser beam LB is irradiated. For example, the expansion part EXP may be, but not limited to, a beam expander. The expansion part EXP may include one or more lenses. The expansion part EXP may have a predetermined magnification.

The diameter of the laser beam LB may increase when the laser beam LB passes through the expansion part EXP. The diameter of the laser beam LB incident to the expansion part EXP may be smaller than the diameter of the laser beam LB exiting from the expansion part EXP. The laser beam LB exiting from the expansion part EXP may reach the lens assembly LA.

The lens assembly LA may be disposed between the light source LS and the stage ST. In detail, the lens assembly LA may be located at a path of the laser beam LB, which is defined between the light source LS and the stage ST.

The lens assembly LA may irradiate the laser beam LB to the substrate SUB disposed on the stage ST. In more detail, the lens assembly LA may adjust a direction in which the laser beam LB is irradiated. For example, the lens assembly LA may determine a position of a spot of the laser beam LB irradiated to the substrate SUB, which is disposed on one surface of the stage ST. To this end, the lens assembly LA may include at least one reflective mirror. For example, the lens assembly LA may include a galvanometer.

In addition, the lens assembly LA may condense the laser beam LB. For example, the lens assembly LA may increase an amount of the laser beam LB irradiated in the spot, and thus may increase the energy density transmitted to the spot.

Figure 2:
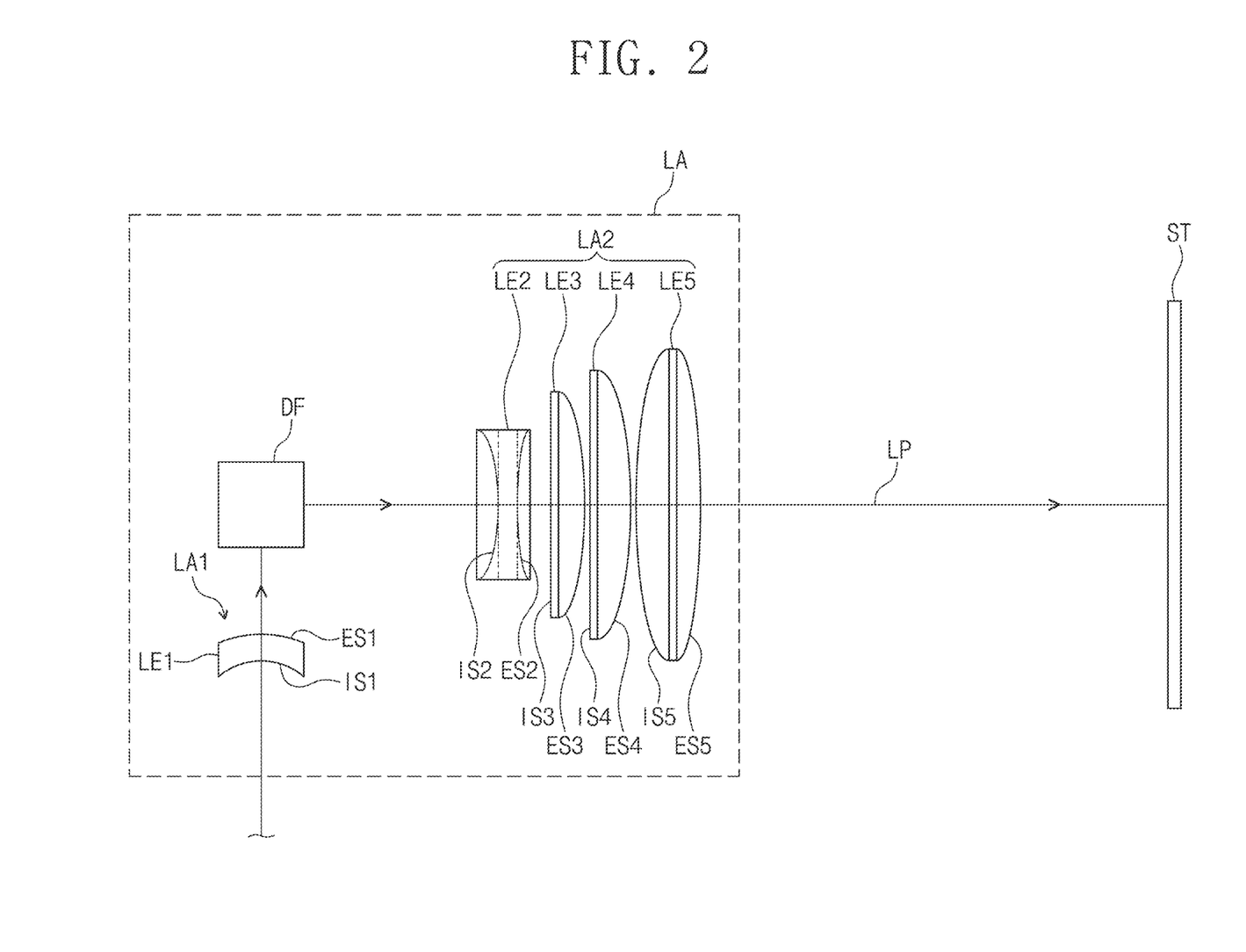
FIG. 2 is a schematic view showing a lens assembly shown in FIG. 1.

FIG. 2 is a schematic view showing the lens assembly LA shown in FIG. 1.

Hereinafter, the structure of the lens assembly LA will be described in detail. For the convenience of explanation, in FIG. 2, the lens assembly LA is rotated about 90° in a counterclockwise direction compared to FIG. 1. In other words, a horizontal direction in FIG. 2 corresponds to a vertical direction in FIG. 1 and vice versa.

Referring to FIG. 2, the lens assembly LA may include a first lens assembly LA1, a deflector DF, and a second lens assembly LA2. The laser beam LB (illustrated in FIG. 1) incident into the lens assembly LA may be provided to the stage ST along a light path LP.

The first lens assembly LA1 may be may be disposed in front of the deflector DF, and the second lens assembly LA2 may be disposed behind the deflector DF based on the light path LP.

In the present embodiment, a focal length of the entire lens assembly LA may have a positive focal length. The first lens assembly LA1 may have a negative focal length, and the second lens assembly LA2 may have a positive focal length. In FIG. 2, when the focal length is greater than 0, it means that a focus of the lens is defined on a right side of the lens. When the focal length is smaller than 0, it means that the focus of the lens is defined on a left side of the lens.

The first lens assembly LA1 may diffuse the laser beam LB (illustrated in FIG. 1) provided from the light source LS (illustrated in FIG. 1). The first lens assembly LA1 may make divergent the laser beam LB (illustrated in FIG. 1). The first lens assembly LA1 may include a first lens LE1. As another example, the first lens assembly LA1 may include a plurality of lenses.

The first lens LE1 may have the negative focal length. In detail, the first lens LE1 may include a first light incident surface IS1 and a first light exit surface ES1. In the present disclosure, the light incident surface may be defined as a surface to which the laser beam is incident in the lens, and the light exit surface may be defined as a surface from which the laser beam exits in the lens. The first light exit surface ES1 may be a surface opposite to the first light incident surface IS1.

The first light incident surface IS1 may have a concave shape. The first light exit surface ES1 may have a convex shape. An absolute value of a radius of curvature of the first light exit surface ES1 may be equal to or greater than an absolute value of a radius of curvature of the first light incident surface IS1.

The deflector DF may change the light path LP of the laser beam LB (illustrated in FIG. 1) provided from the first lens assembly LA1. As shown in FIG. 2, the deflector DF may change the light path LP from the vertical direction to the horizontal direction.

The deflector DF may determine the position of the spot of the laser beam LB (illustrated in FIG. 1) irradiated to the stage ST. For example, the deflector DF may include the galvanometer. In detail, the deflector DF may include a first mirror (not shown) and a second mirror (not shown). Each of the first and second mirrors may rotate about different rotation axes. Angles of the first and second mirrors may determine the position of the spot on the stage ST. The first mirror may be disposed adjacent to the first lens LE1, and the second mirror may be disposed adjacent to the second lens LE2. This will be described in detail later.

The second lens assembly LA2 may include a plurality of lenses. In the embodiment, the second lens assembly LA2 may include a second lens LE2, a third lens LE3, a fourth lens LE4, and a fifth lens LE5. The second to fifth lenses LE2, LE3, LE4, and LE5 may be sequentially arranged on the light path LP along the horizontal direction a shown in FIG. 2. However, the number of the lenses included in the second lens assembly LA2 should not be limited thereto or thereby.

According to the embodiment of the present disclosure, the second lens LE2 may have the negative focal length. The second lens LE2 may diffuse the laser beam. The second lens LE2 may make divergent the laser beam. Each of the third to fifth lenses LE3, LE4, and LE5 may have the positive focal length. Each of the third to fifth lenses LE3, LE4, and LE5 may condense the laser beam.

In detail, the second lens LE2 may include a second light incident surface IS2 and a second light exit surface ES2. The second light exit surface ES2 may be a surface opposite to the second light incident surface IS2. Each of the second light incident surface IS2 and the second light exit surface ES2 may have a concave shape. An absolute value of a radius of curvature of the second light exit surface ES2 may be equal to or greater than an absolute value of a radius of curvature of the second light incident surface IS2.

The third lens LE3 may include a third light incident surface IS3 and a third light exit surface ES3. The third light incident surface IS3 may face the second light exit surface ES2 of the second lens LE2. The third light exit surface ES3 may be a surface opposite to the third light incident surface IS3. The third light incident surface IS3 may be a flat surface. The third light exit surface ES3 may have a convex shape.

The fourth lens LE4 may include a fourth light incident surface IS4 and a fourth light exit surface ES4. The fourth light incident surface IS4 may face the third light exit surface ES3 of the third lens LE3. The fourth light exit surface ES4 may be a surface opposite to the fourth light incident surface IS4. The fourth light incident surface IS4 may be a flat surface. The fourth light exit surface ES4 may have a convex shape.

The fifth lens LE5 may include a fifth light incident surface IS5 and a fifth light exit surface ES5. The fifth light incident surface IS5 may face the fourth light exit surface ES4 of the fourth lens LE4. The fifth light exit surface ES5 may be a surface opposite to the fifth light incident surface IS5. Each of the fifth light incident surface IS5 and the fifth light exit surface ES5 may have a convex shape. An absolute value of a radius of curvature of the fifth light exit surface ES5 may be equal to or greater than an absolute value of a radius of curvature of the fifth light incident surface IS5.

According to the embodiment of the present disclosure, since the light incident surfaces IS3 and IS4 of the third and fourth lenses LE3 and LE4 are flat, a processing of the lens assembly LA may be facilitated and a manufacturing cost of the lens assembly LA may be lowered.

According to the embodiment of the present disclosure, the third to fifth lenses LE3, LE4, and LE5 may have an Abbe's number greater than that of the first and second lenses LE1 and LE2. That is, the first and second lenses LE1 and LE2 may have a resolution power higher than that of the third to fifth lenses LE3, LE4, and LE5.

According to the embodiment of the present disclosure, the first to fifth lenses LE1, LE2, LE3, LE4, and LE5 may include a material having a low light absorption rate. In the present embodiment, the first to fifth lenses LE1, LE2, LE3, LE4, and LE5 may include fused silica or calcium fluoride ($CaF_2$).

However, the material for the first to fifth lenses LE1, LE2, LE3, LE4, and LE5 should not be limited thereto or thereby, and the first to fifth lenses LE1, LE2, LE3, LE4, and LE5 may include a material having the low light absorption rate in a wide spectrum range.

Figure 3:
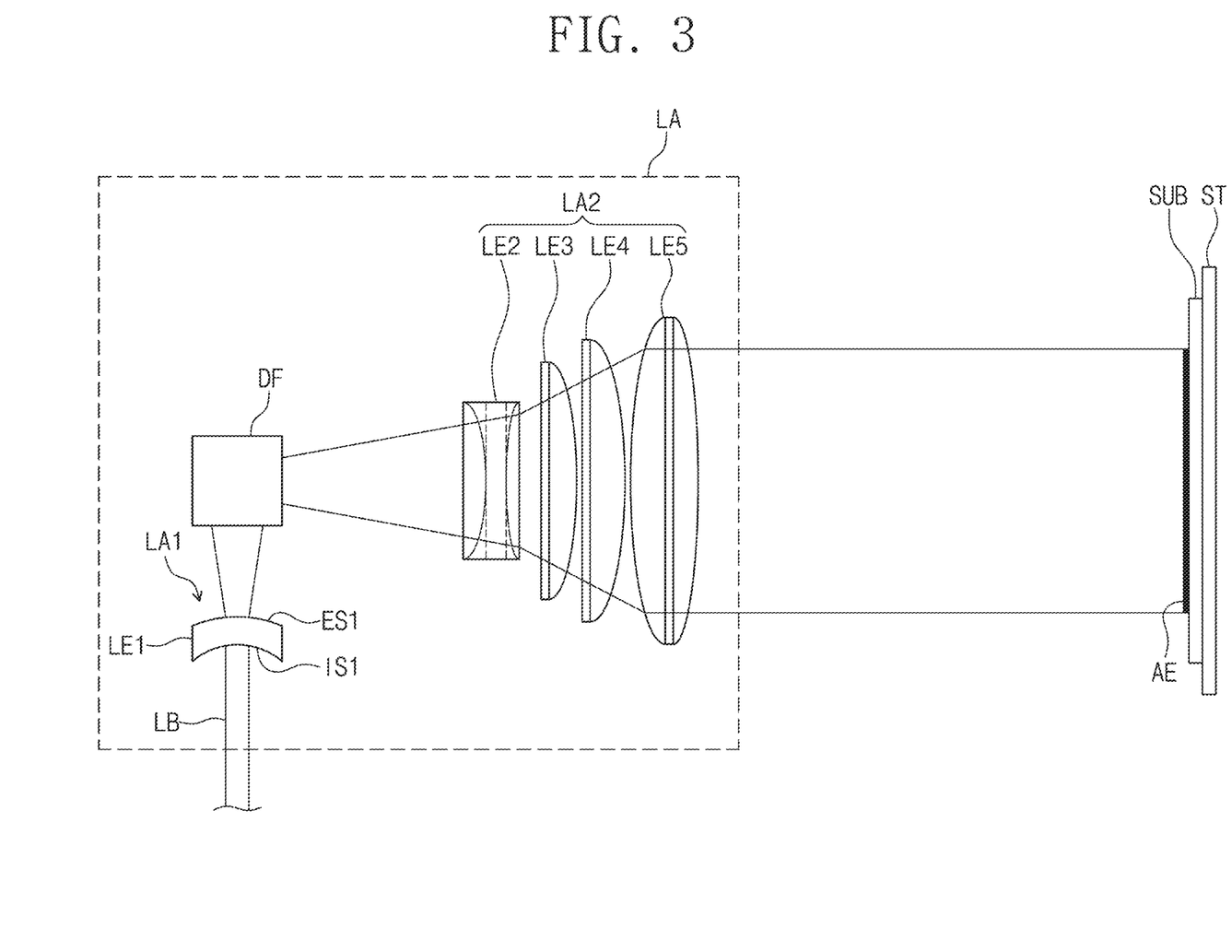
FIG. 3 is a schematic view showing a laser beam irradiated to a substrate after passing through the lens assembly shown in FIG. 2.

FIG. 3 is a schematic view showing the laser beam LB irradiated to the substrate SUB after passing through the lens assembly LA shown in FIG. 2. Table 1 shows specifications of the lens assembly LA shown in FIG. 3

In Table 1, R1 denotes the radius of curvature of the light incident surfaces IS1, IS2, IS3, IS4, and IS5. R2 denotes the radius of curvature of the light exit surfaces ES1, ES2, ES3, ES4, and ES5. The units of curvature radius, thickness, and diameter are a millimeter (mm). When the radius of curvature (or the focal length) is negative in Table 1, it means that the focus of the light incident surface (or the light exit surface) is defined on the side where the laser is incident. When the radius of curvature (or the focal length) is positive in Table 1, it means that the focus of the light incident surface (or the light exit surface) is defined on the side where the laser exits.

TABLE 1

| | | | Radius of curvature (mm) | Thickness (mm) | Diameter (mm) | material |
|---|---|---|---|---|---|---|
| First lens assembly | First lens | R1 | −58.42 | 5 | 11 | Fused silica |
| | | R2 | −124.53 | | | |
| Second lens assembly | Second lens | R1 | −261.21 | 10 | 74 | Fused silica |
| | | R2 | 536.59 | | | |
| | Third lens | R1 | ∞ | 25 | 104 | $CaF_2$ |
| | | R2 | −165.39 | | | |
| | Fourth lens | R1 | ∞ | 25 | 138 | $CaF_2$ |
| | | R2 | −269.83 | | | |
| | Fifth lens | R1 | 294.55 | 35 | 152 | $CaF_2$ |
| | | R2 | −352.9 | | | |

In the present embodiment, a distance between the first light exit surface ES1 of the first lens LE1 and the first mirror of the deflector DF is about 65 mm. A distance between the first mirror and the second mirror of the deflector DF is about 16.5 mm. A distance between the second mirror of the deflector DF and the second light incident surface IS2 of the second lens LE2 is about 129.45 mm. A distance between the second light exit surface ES2 of the second lens LE2 and the third light incident surface IS3 of the third lens LE3 is about 8.96 mm. A distance between the third light exit surface ES3 of the third lens LE3 and the fourth light incident surface IS4 of the fourth lens LE4 is about 0.5 mm. A distance between the fourth light exit surface ES4 of the fourth lens LE4 and the fifth light incident surface IS5 of the fifth lens LE5 is about 0.5 mm. A distance between the fifth light exit surface ES5 of the fifth lens LE5 and the substrate SUB is about 350.45 mm.

Referring to Table 1, the first lens LE1 and the second lens LE2 may include the fused silica, and the third to fifth lenses LE3, LE4, and LE5 may include calcium fluoride ($CaF_2$).

In the present embodiment, the focal length of the lens assembly LA is about 165 mm. The focal length of the lens assembly LA is a composite focal length of the first to fifth lenses LE1, LE2, LE3, LE4, and LE5. The substrate SUB may be disposed to be spaced apart from a center of the lens assembly LA by about 165 mm.

In the present embodiment, the focal length of the first lens assembly LA1 is about −250.58 mm. The focal length of the second lens assembly LA2 is about 212.72 mm.

In the present embodiment, the focal length of the first lens LE1 is about −250.58 mm. The focal length of the second lens LE2 is about −389.20 mm. The focal length of the third lens LE3 is about 385.98 mm. The focal length of the fourth lens LE4 is about 629.72 mm. The focal length of the fifth lens LE5 is about 380.86 mm.

As shown in Table 1, a ratio of the focal length of the first lens LE1 to the focal length of the lens assembly LA is about −1.52 (−250.58/165). A ratio of the focal length of the second lens LE2 to the focal length of the lens assembly LA is about −2.36 (−389.20/165). A ratio of the focal length of the third lens LE3 to the focal length of the lens assembly LA is about 2.34 (385.98/165). A ratio of the focal length of the fourth lens LE4 to the focal length of the lens assembly LA is about 3.82 (629.72/165). A ratio of the focal length of the fifth lens LE5 to the focal length of the lens assembly LA is about 2.31 (380.86/165). The above values are rounded values to the third decimal place.

The laser beam LB may sequentially reach the first lens assembly LA1, the deflector DF, and the second lens assembly LA2 of the lens assembly LA.

The first lens assembly LA1 may have a negative refractive power. Accordingly, the first lens assembly LA1 may diffuse the laser beam LB provided thereto.

The deflector DF may change the light path LP of the laser beam LB provided from the first lens assembly LA1. As shown in FIG. 3, the deflector DF may change the irradiation direction of the laser beam LB incident thereto to the horizontal direction from the vertical direction. However, referring to FIG. 1, it may be described that the irradiation direction of the laser beam LB is changed from the horizontal direction to the vertical direction.

The second lens assembly LA2 may have a positive refractive power. The second lens assembly LA2 may condense the laser beam LB provided from the deflector DF. In detail, the second lens LE2 may have the negative refractive power, and thus may diffuse the laser beam LB. The third to fifth lenses LE3, LE4, and LE5 may have the positive refractive power and may condense the laser beam LB.

The laser beam LB exiting from the second lens assembly LA2 of the lens assembly LA may reach the substrate SUB disposed on the stage ST. The laser device LD (refer to FIG. 1) may irradiate the laser beam LB to a processing area AE, and thus may process the substrate SUB. The processing area AE may be defined in the upper surface of the substrate SUB.

Figure 4:
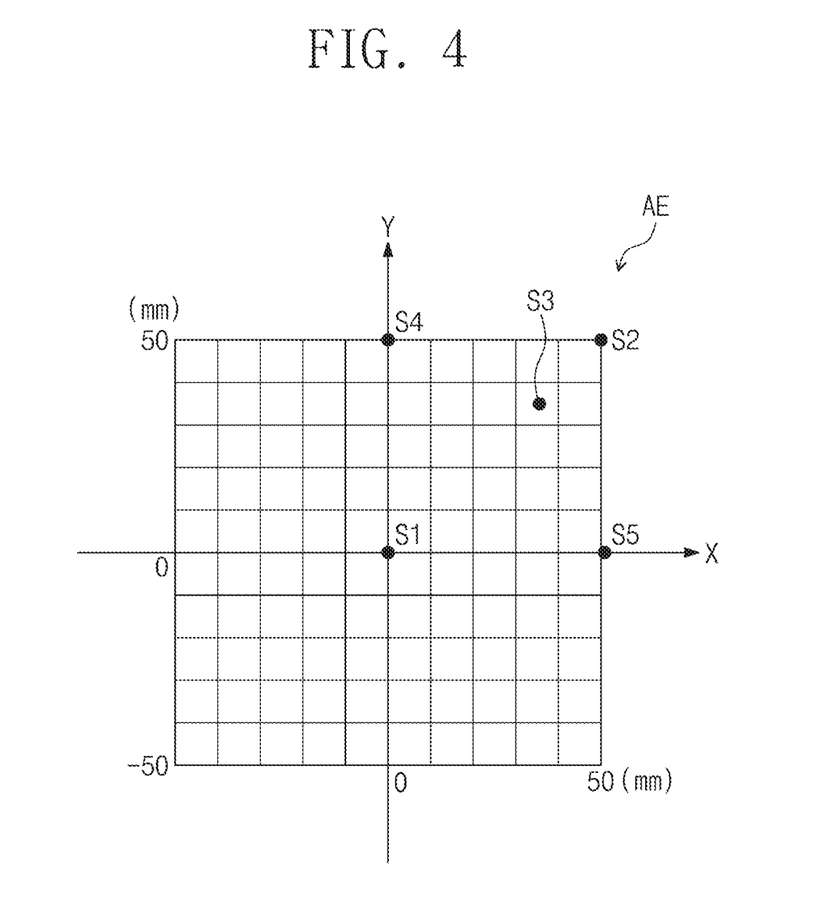
FIG. 4 is a view showing a processing area shown in FIG. 3 when viewed in a plane.

FIG. 4 is a view showing the processing area AE shown in FIG. 3 when viewed in a plane. In FIG. 4, an X-axis is defined as an axis substantially parallel to a horizontal direction, and a Y-axis is defined as an axis substantially parallel to a vertical direction.

Referring to FIG. 4, the processing area AE may have a rectangular shape when viewed in a plane. For example, the processing area AE may have a range from about −50 mm to about 50 mm in the X-axis and a range from about −50 mm to about 50 mm in the Y-axis. However, this is merely an example, and the shape and the size of the processing area AE should not be limited thereto or thereby.

The laser device LD (illustrated in FIG. 1) may irradiate the laser beam LB (illustrated in FIG. 1) to an arbitrary spot on the processing area AE. The position of the spot may be determined by the deflector DF (illustrated in FIG. 3). For example, the first mirror of the deflector DF (illustrated in FIG. 3) may determine the position of the spot in the X-axis. The second mirror of the deflector DF (illustrated in FIG. 3) may determine the position of the spot in the Y-axis.

First, second, third, fourth, and fifth spots S1, S2, S3, S4, and S5 may be defined in the processing area AE. The first spot S1 may be defined as a center area of the processing area AE. Coordinates of the first spot S1 may be about (0, 0). The second spot S2 may be a point that is the most distant from the first spot S1 on the processing area AE and may be defined as an edge area of the processing area AE. The second spot S2 may be a point separated from the first spot S1 by about 50 mm in the X-axis and by about 50 mm in the Y-axis. Coordinates of the second spot S2 may be about (50, 50). Coordinates of the third spot S3, the fourth spot S4, and the fifth spot S5 may be about (36, 35), (0, 50), and (50, 0), respectively.

Figure 5A:
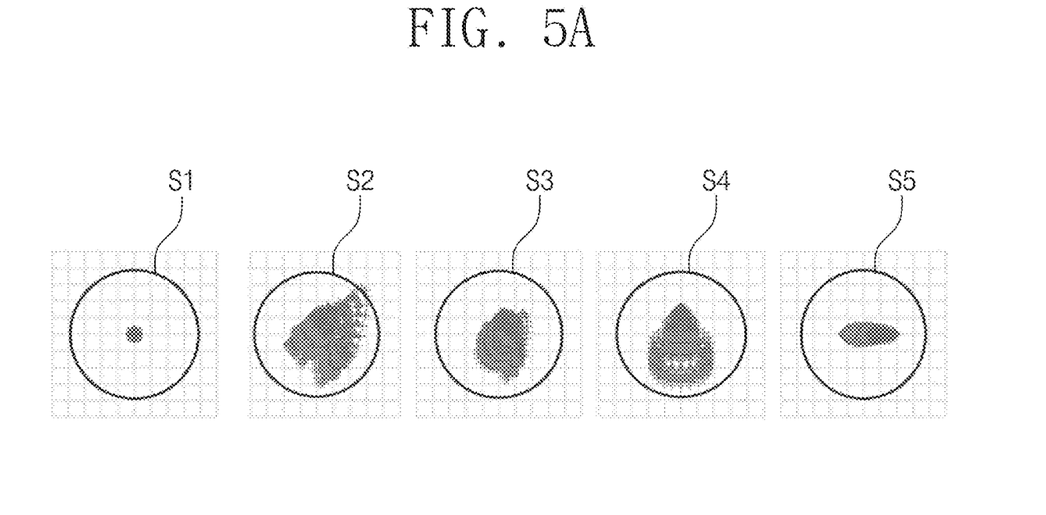
FIG. 5A is a view showing a laser beam irradiated to the processing area using a laser device according to an embodiment of the present disclosure.
Figure 5B:
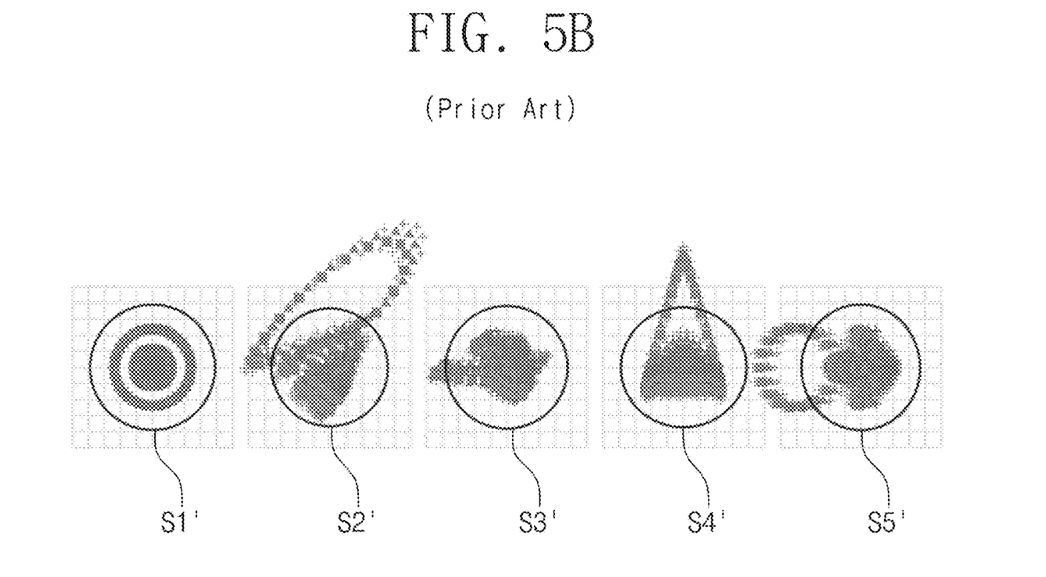
FIG. 5B is a view showing a laser beam irradiated to a processing area using a laser device according to a comparative example of a prior art.

FIG. 5A is a view showing the laser beam irradiated to the processing area using the laser device according to an embodiment of the present disclosure. FIG. 5B is a view showing a laser beam irradiated to a processing area using a laser device according to a comparative example. A boundary of each of the spots S1, S2, S3, S4, and S5 shown in FIGS. 5A and 5B means an airy disk.

FIGS. 5A and 5B are experimental results of measuring aberration in each of the spots S1, S2, S3, S4, and S5. That is, when all laser beams are irradiated inside the boundary of the spot, it may be considered that there is no aberration at the spot.

The laser device according to the present embodiment has the specifications shown in Table 1. The laser device according to the comparative example does not include a lens, i.e., the first lens assembly LA1 of the present disclosure, disposed between the light source and the deflector when compared with the laser device according to the present disclosure.

In FIGS. 5A and 5B, the same laser beam was used. In detail, the laser beam irradiated by the light source has a width of about 11 mm, a central wavelength of about 1064 nm, and a spectral bandwidth of about 10 nm.

Referring to FIG. 5A, it was observed that the laser beam was irradiated inside the spot. In detail, in the first, third, fourth, and fifth spots S1, S3, S4, and S5, the laser beams were irradiated inside the boundary of the spot. That is, the aberration did not occur in each of the first, third, fourth, and fifth spots S1, S3, S4, and S5. In the second spot S2, some laser beams were irradiated to the boundary and the outside of the spot, but most of the laser beams were irradiated inside the boundary of the spot. That is, a slight aberration occurred in the second spot S2 that is the edge area.

Consequently, according to the present embodiment, the slight aberration occurred in the second spot S2 that is the edge area, however, no aberration occurred in the other spots S1, S3, S4, and S5.

Referring to FIG. 5B, it was observed that some laser beams were irradiated outside the spots in the comparative example. In detail, the laser beams irradiated to a first spot S1' were irradiated inside a boundary of the first spot S1' in the comparative example. That is, no aberration occurred in the first spot S1'.

Some laser beams irradiated to second to fifth spots S2', S3', S4', and S5' were irradiated outside a boundary of each spot. Particularly, it was observed that a significant amount of the laser beams irradiated to the second spot S2' were irradiated outside the boundary of the second spot S2'. That is, the aberration occurred in the second to fifth spots S2', S3', S4', and S5' was greater than the aberration occurred in the spots of the present disclosure.

Consequently, according to the comparative example, the aberration occurred in the other spots S2', S3', S4', and S5' except the first spot S1' that is the center area.

According to the experimental results shown in FIGS. 5A and 5B, when compared with the comparative example, there was a little or no aberration in each of the spots S1, S2, S3, S4, and S5 in the present embodiment. Through the above experiment results, it was observed that the laser device according to the present embodiment has a higher precision than the laser device according to the comparative example.

Figure 6A:
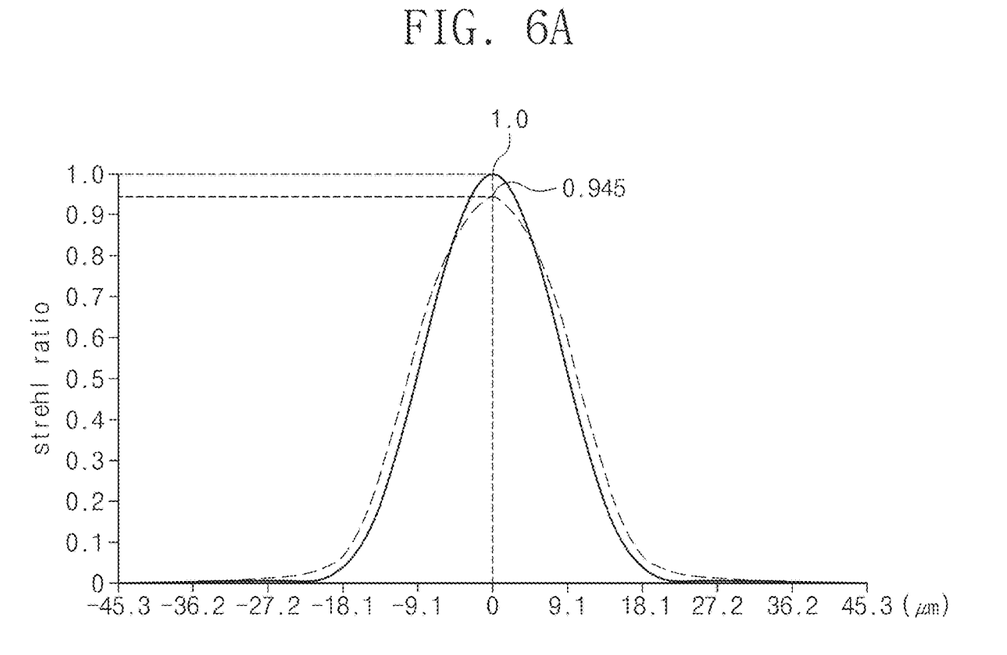
FIG. 6A is a graph showing a Strehl ratio of a laser beam measured at a first spot (center area) shown in FIGS. 5A and 5B.
Figure 6B:
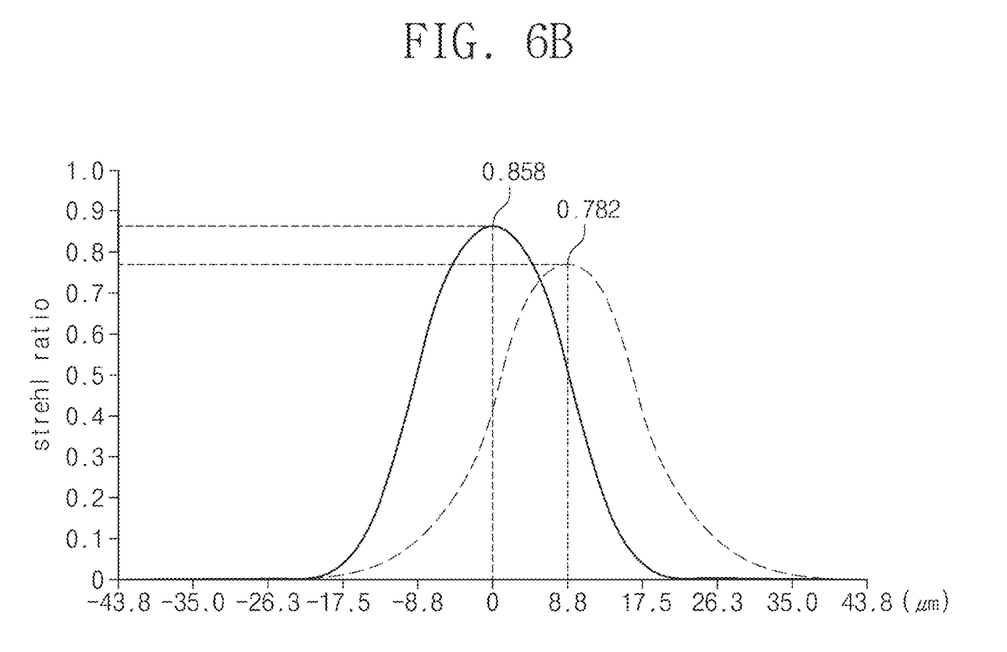
FIG. 6B is a graph showing a Strehl ratio of a laser beam measured at a second spot (edge area) shown in FIGS. 5A and 5B.

FIG. 6A is a graph showing a Strehl ratio of the laser beam measured at the first spot (center area) shown in FIGS. 5A and 5B. FIG. 6B is a graph showing a Strehl ratio of the laser beam measured at the second spot (edge area) shown in FIGS. 5A and 5B.

In FIGS. 6A and 6B, a solid line means the Strehl ratio in the present embodiment, and a dotted line means the Strehl ratio in the comparative example. In FIGS. 6A and 6B, an X-axis represents a distance from a center point of a spot, and a Y-axis represents the Strehl ratio. In each of FIGS. 6A and 6B, an area defined by the solid line and an area defined by the dotted line are the same.

Referring to FIG. 6A, a maximum value of the Strehl ratio of the first spot S1 (illustrated in FIG. 5A) was about 1 in the present embodiment, and a maximum value of the Strehl ratio of the first spot S1' (illustrated in FIG. 5B) was about 0.945 in the comparative example. In other words, the maximum value of the Strehl ratio in the center area of the processing area in the present embodiment was higher than that in the comparative example.

Referring to FIG. 6B, a maximum value of the Strehl ratio of the second spot S2 (illustrated in FIG. 5A) was about 0.858 in the present embodiment, and a maximum value of the Strehl ratio of the second spot S2' (illustrated in FIG. 5B) was about 0.782 in the comparative example. In other words, the maximum value of the Strehl ratio in the edge area of the processing area in the present embodiment was higher than that in the comparative example.

Figure 7A:
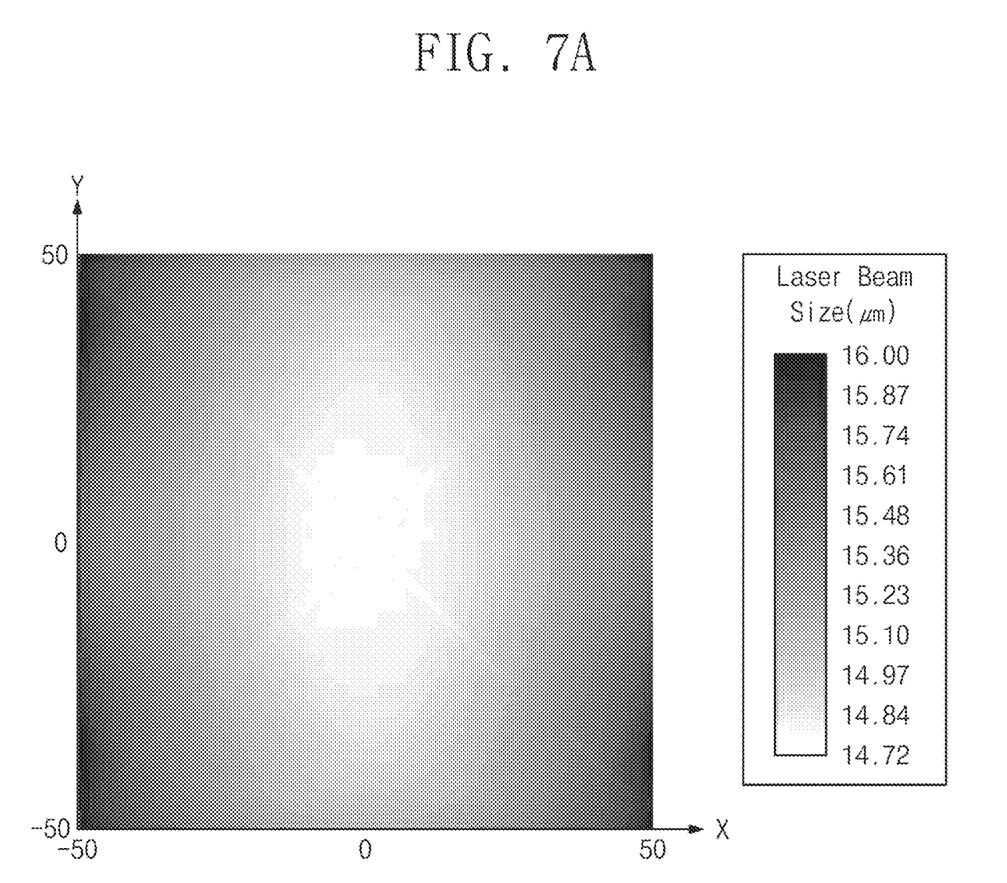
FIG. 7A is a view showing a spot size of the laser beam according to a position on a processing area according to an embodiment of the present disclosure.
Figure 7B:
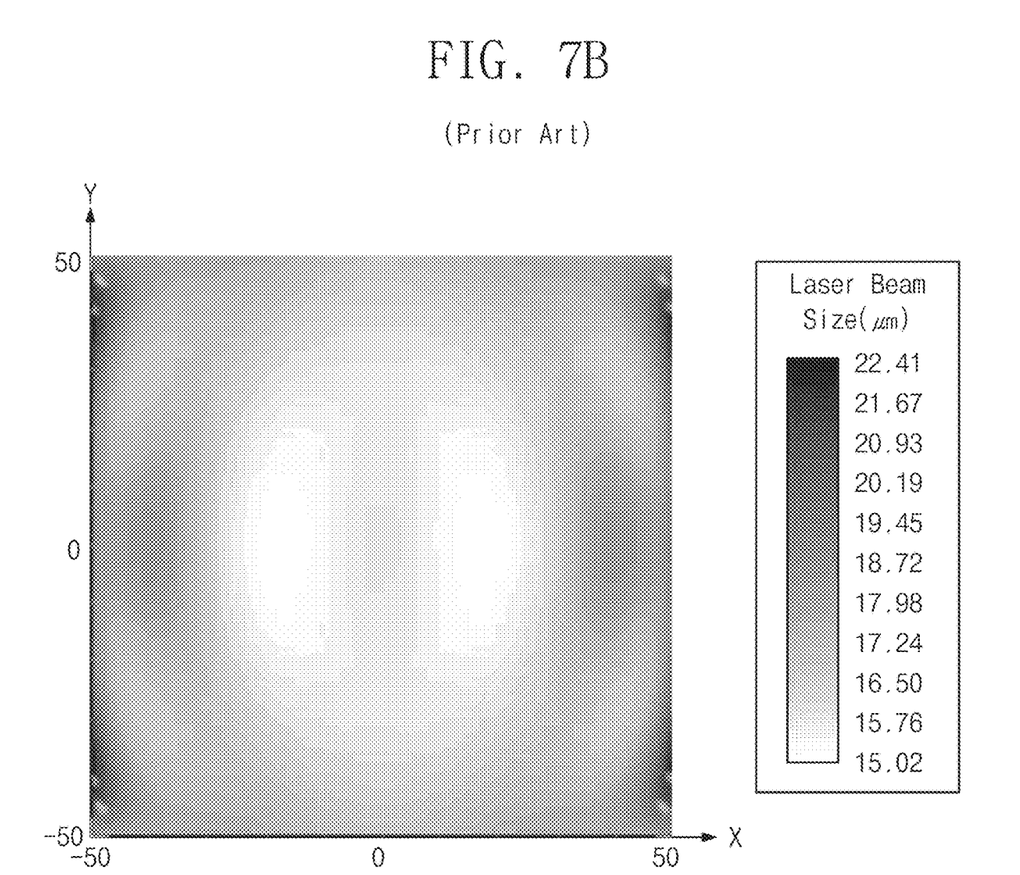
FIG. 7B is a view showing a spot size of the laser beam according to a position on a processing area according to a comparative example of the prior art.

FIG. 7A is a view showing a spot size of the laser beam according to the position on the processing area according to an embodiment of the present disclosure. FIG. 7B is a view showing a spot size of the laser beam according to the position on the processing area according to a comparative example. Values shown in Tables of FIGS. 7A and 7B mean a radius of the spot size of the laser beam. The unit of the spot size of the laser beam is micrometer (μm).

Referring to FIG. 7A, the spot size of the laser beam was about 29.44 micrometers in the center area, e.g., the first spot, and was about 32.00 micrometers in the edge area, e.g., the second spot, in the present embodiment. In the present embodiment, a variation in spot size of the laser beam between the center area and the edge area was about 2.56 micrometers. On the other hand, referring to FIG. 7B, the spot size of the laser beam was about 30.04 micrometers in the center area and was about 44.82 micrometers in the edge area in the comparative example. In the comparative example, a variation in spot size of the laser beam between the center area and the edge area was about 14.78 micrometers.

Consequently, it was observed that the spot size of the laser beam is uniform throughout the processing area in the present embodiment. According to the embodiment of the present disclosure, the laser device LD may irradiate the laser beam having the uniform energy density to the substrate SUB disposed on the stage ST, and thus, the laser processing operation with high degree of completion may be performed (illustrated in FIG. 1).

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present disclosure shall be determined according to the attached claims.

What is claimed is:

1. A laser device comprising:
   a light source configured to generate a laser beam;
   a stage to hold a substrate; and
   a lens assembly disposed between the light source and the stage and irradiating the laser beam to the substrate disposed on the stage, the lens assembly comprising:
   a first lens assembly making divergent the laser beam provided from the light source;
   a deflector changing a path of the laser beam provided from the first lens assembly, the deflector comprising a first mirror and a second mirror; and
   a second lens assembly condensing the laser beam provided from the deflector and irradiating the condensed laser beam to the substrate,
   wherein the second lens assembly comprises a second lens closest to the deflector, a third lens next to the second lens, a fourth lens next to the third lens, and a fifth lens farthest from the deflector,
   wherein a diameter of the second lens is smaller than a diameter of the fifth lens,
   wherein the first mirror of the deflector is disposed adjacent to the first lens assembly and the second mirror of the deflector is disposed adjacent to the second lens assembly, and the first mirror rotates in a first axis and the second mirror rotates in a second axis which is perpendicular to the first axis,
   wherein the first lens assembly comprises a first lens including a first light incident surface and a first light exit surface, the first light incident surface having a concave shape and the first light exit surface having a convex shape, and
   wherein an absolute value of a radius of curvature of the first light exit surface is equal to or greater than a radius of curvature of the first light incident surface.

2. The laser device of claim 1, wherein the lens assembly has a positive focal length, the first lens assembly has a negative focal length, and the second lens assembly has the positive focal length.

3. The laser device of claim 2, wherein the focal length of the lens assembly is about 165 mm, the focal length of the first lens assembly is −250.58 mm, and the focal length of the second lens assembly is 212.72 mm.

4. The laser device of claim 1, wherein the second lens comprises a second light incident surface and a second light exit surface that is a surface opposite to the second light incident surface, the third lens comprises a third light incident surface facing the second light exit surface and a third light exit surface that is a surface opposite to the third light incident surface, the fourth lens comprises a fourth light incident surface facing the third light exit surface and a fourth light exit surface that is a surface opposite to the fourth light incident surface, and the fifth lens comprises a fifth light incident surface facing the fourth light exit surface and a fifth exit surface that is a surface opposite to the fifth light incident surface.

5. The laser device of claim 4, wherein the second lens has the negative focal length, and each of the third, fourth, and fifth lenses has the positive focal length.

6. A laser device comprising:
   a light source configured to generate a laser beam;
   a stage to hold a substrate; and
   a lens assembly disposed between the light source and the stage and irradiating the laser beam to the substrate disposed on the stage, the lens assembly comprising:
   a first lens assembly making divergent the laser beam provided from the light source;
   a deflector changing a path of the laser beam provided from the first lens assembly; and a second lens assembly condensing the laser beam provided from the deflector and irradiating the condensed laser beam to the substrate, wherein the second lens assembly comprises a second lens closest to the deflector, a third lens next to the second lens, a fourth lens next to the third lens, and a fifth lens farthest from the deflector, wherein a diameter of the second lens is smaller than a diameter of the fifth lens, wherein the second lens comprises a second light incident surface and a second light exit surface that is a surface opposite to the second light incident surface, the third lens comprises a third light incident surface facing the second light exit surface and a third light exit surface that is a surface opposite to the third light incident surface, the fourth lens comprises a fourth light incident surface facing the third light exit surface and a fourth light exit surface that is a surface opposite to the fourth light incident surface, and the fifth lens comprises a fifth light incident surface facing the fourth light exit surface and a fifth exit surface that is a surface opposite to the fifth light incident surface, and wherein the second light incident surface and the second light exit surface of the second lens have a concave shape, the third light incident surface of the third lens is a flat surface, the third light exit surface has a convex shape, the fourth light incident surface of the fourth lens is a flat surface, the fourth light exit surface has a convex shape, and the fifth light incident surface and the fifth light exit surface of the fifth lens have a convex shape.

7. The laser device of claim 5, wherein a ratio of the focal length of the first lens to the focal length of the lens assembly is −1.52, a ratio of the focal length of the second lens to the focal length of the lens assembly is −2.36, a ratio of the focal length of the third lens to the focal length of the lens assembly is 2.34, a ratio of the focal length of the fourth lens to the focal length of the lens assembly is 3.82, and a ratio of the focal length of the fifth lens to the focal length of the lens assembly is 2.31.

8. The laser device of claim 4, wherein each of the third, fourth, and fifth lenses has an abbe's number higher than an abbe's number of the second lens.

9. The laser device of claim 4, wherein the second lens comprises calcium fluoride (CaF$_2$), and each of the third, fourth, and fifth lenses comprises a fused silica.

10. The laser device of claim 1, further comprising an expansion part disposed between the light source and the lens assembly, wherein the expansion part expands a diameter of the laser beam incident thereto from the light source and outputs the laser beam to the lens assembly.

11. The laser device of claim 1, wherein the deflector comprises a plurality of mirrors.

12. A lens assembly comprising:
a first lens assembly making divergent a laser beam;
a deflector changing a path of the laser beam provided from the first lens assembly, the deflector comprising a first mirror and a second mirror; and
a second lens assembly condensing the laser beam provided from the deflector and irradiating the condensed laser beam to a substrate, wherein the second lens assembly comprises a second lens closest to the deflector, a third lens next to the second lens, a fourth lens next to the third lens, and a fifth lens farthest from the deflector, wherein a diameter of the second lens is smaller than a diameter of the fifth lens, wherein the first mirror of the deflector is disposed adjacent to the first lens assembly and the second mirror of the deflector is disposed adjacent to the second lens assembly, and the first mirror rotates in a first axis and the second mirror rotates in a second axis which is perpendicular to the first axis, wherein the first lens assembly comprises a first lens including a first light incident surface and a first light exit surface, the first light incident surface having a concave shape and the first light exit surface having a convex shape, and wherein an absolute value of a radius of curvature of the first light exit surface is equal to or greater than a radius of curvature of the first light incident surface.

13. The lens assembly of claim 12, wherein the second lens assembly comprises a second lens, a third lens, a fourth lens, and a fifth lens.

14. The lens assembly of claim 13, wherein the lens assembly has a positive focal length, the first lens assembly has a negative focal length, and the second lens assembly has the positive focal length.

15. The lens assembly of claim 14, wherein the second lens has the negative focal length, and each of the third, fourth, and fifth lenses has the positive focal length.

16. The lens assembly of claim 14, wherein a ratio of the focal length of the first lens to the focal length of the lens assembly is −1.52, a ratio of the focal length of the second lens to the focal length of the lens assembly is −2.36, a ratio of the focal length of the third lens to the focal length of the lens assembly is 2.34, a ratio of the focal length of the fourth lens to the focal length of the lens assembly is 3.82, and a ratio of the focal length of the fifth lens to the focal length of the lens assembly is 2.31.

17. The lens assembly of claim 13, wherein each of the third, fourth, and fifth lenses has an abbe's number higher than an abbe's number of the second lens.

18. The lens assembly of claim 13, wherein the second lens comprises calcium fluoride (CaF$_2$), and each of the third, fourth, and fifth lenses comprises a fused silica.

* * * * *